United States Patent [19]

Chant et al.

[11] 4,000,097
[45] Dec. 28, 1976

[54] PREPARATION OF A THERMOSETTING RESIN ARTICLE

[75] Inventors: Peter R. Chant; Albert W. de Ruyter van Steveninck, both of Delft, Netherlands

[73] Assignee: Shell Oil Company, Houston, Tex.

[22] Filed: Sept. 17, 1975

[21] Appl. No.: 614,119

Related U.S. Application Data

[62] Division of Ser. No. 351,733, April 16, 1973, Pat. No. 3,930,919.

[30] Foreign Application Priority Data

Apr. 24, 1972  United Kingdom ............ 18890/72

[52] U.S. Cl. .............................. 260/2.5 A; 156/77; 260/2.5 BE; 260/2.5 R
[51] Int. Cl.² .......................................... C08J 9/00
[58] Field of Search .................. 428/310, 311, 315; 156/77; 260/2.5 A, 2.5 BE, 2.5 R

[56] References Cited

UNITED STATES PATENTS

| | | | |
|---|---|---|---|
| 3,647,609 | 3/1972 | Cyba | 428/315 |
| 3,867,221 | 2/1975 | Chant | 156/77 |

FOREIGN PATENTS OR APPLICATIONS

| | | | |
|---|---|---|---|
| 1,266,097 | 3/1972 | United Kingdom | 428/315 |

*Primary Examiner*—William J. Van Balen
*Attorney, Agent, or Firm*—Norris E. Faringer

[57] ABSTRACT

This invention is an improvement in a process for making a thermosetting resin article.

In the process of producing an article of thermosetting resin which comprises (a) impregnating a sheet having an open-cell structure with a curable thermosetting resin, (b) applying a layer of fibrous reinforcing material to at least one side of the impregnated sheet, (c) compressing the sheet and reinforcing layer to the extent that resin is expelled from the sheet into the fibrous reinforcing layer and (d) allowing the resin in the sheet and layer to cure while maintaining the compression, the improvement which comprises uniformly incorporating a gas release agent into the curable thermosetting resin to promote the expulsion of resin from the sheet into the reinforcing layer.

The invention also includes an open-cell sheet impregnated with a mixture of a curable thermosetting resin, an effective curing agent for said resin, and a compatible gas release agent.

5 Claims, No Drawings

PREPARATION OF A THERMOSETTING RESIN ARTICLE

This is a division, of application Ser. No. 351,733, filed Apr. 16, 1973, now U.S. Pat. No. 3,930,919, issued Jan. 16, 1976.

BACKGROUND OF THE INVENTION

1. Field of the Invention

The invention concerns a process of producing an article of thermosetting resin and a flexible, compressible thermosetting resin impregnated open-cell sheet useful in the process.

2. Description of the Prior Art

British Patent Application No. 1,266,097 describes a process for making an article of thermosetting resin which comprises (a) impregnating a sheet having an open-cell structure with a curable thermosetting resin, (b) applying a layer of fibrous reinforcing material to at least one side of the impregnated foam sheet, (c) compressing the foam sheet and reinforcing layer to the extent that resin is expelled from the sheet into the fibrous reinforcing layer so as to impregnate this layer with resin throughout its thickness, and (d) allowing the resin in the sheet and layer to cure while maintaining the compression. The process described in the British patent is an entirely new way to make laminated-type articles.

It is generally known in the art that gas release agents (also referred to as blowing agents or foaming agents) have been used for years to mix with curable thermosetting resins to form foamable compositions which generally form light weight thermoset foams. See for example U.S. 3,320,187 to Burt; U.S. 3,373,121 to Burgert and Moore; U.S. 3,282,863 to Carey and Jones; and U.S. 3,252,923 to Salgado and Berlinger.

Surprisingly, it has now been discovered that by using a curable thermosetting resin in which there is incorporated a small amount of a gas release agent as the curable thermosetting resin in the process described in British Patent 1,266,097 the expulsion of the resin from the foam sheet into the fibrous reinforcing layer is promoted and as a result less resin is required in the process.

In the process disclosed in British Patent No. 1,266,097 it is necessary that sufficient resin is expelled from the foam sheet to thoroughly impregnate the adjacent fibrous reinforcing layer. The resin is driven into the fibrous layer by compression of the foam sheet, and usually, although generally low pressures are needed, a rather high compression of the foam sheet is required to achieve adequate impregnation of the fibrous layer. Accordingly, the extent of compression of the foam sheet is dictated by this impregnation requirement, and there is no complete freedom to apply the compression on the basis of desired final thickness of the product or the final density or porosity of the compressed foam sheet.

An object of this invention is to make the earlier proposed method more widely applicable. Accordingly, the present invention is an improvement in the process referred to above, wherein gas pressure is generated in the cells of the impregnated foam sheet to promote the expulsion of resin from the first sheet into the reinforcing layer.

SUMMARY OF THE INVENTION

In the process of producing an article of thermosetting resin which comprises (a) impregnating a sheet having an open-cell structure with a curable thermosetting resin, (b) applying a layer of fibrous reinforcing material to at least one side of the impregnated sheet, (c) compressing the sheet and reinforcing layer to the extent that resin is expelled from the sheet into the fibrous reinforcing layer to impregnate this layer with resin throughout its thickness, and (d) allowing the resin in the sheet and layer to cure while maintaining the compression, the improvement which comprises uniformly incorporating a gas release agent into the curable thermosetting resin so that gas pressure is generated within the impregnated sheet during compression of the sheet thereby promoting the expulsion of resin from the sheet into the reinforcing layer.

This invention also includes a flexible, compressible, wettable open-cell sheet impregnated with a mixture comprising a curable thermosetting resin, a curing agent for said resin, and a compatible gas release agent.

PREFERRED EMBODIMENTS

Generally, the process of which this invention is an improvement is described in British Patent No. 1,266,097 and as much of that patent as is pertinent is incorporated herein by reference.

The thermosetting resins suitable for use in this process include phenolics, melamines, polyesters, epoxies and silicones. Generally, it is found that polyester and epoxy resins are eminently suitable in this particular process and for this reason are preferred. The thermosetting resins are converted to the thermoset form by cross-linking processes usually accomplished by the addition of a curing agent to the resin. Proper curing agent for epoxy and polyester resins are well known to those skilled in the art. See, for example chapters 5–12 of the Handbook of Epoxy Resins, Lee and Neville, McGraw Hill, Inc. 1863 for curing agents and mechanisms of cure for epoxy resins and chapter 6 of Reinhold Plastic Application Series, polyester resins, Lawrence, Reinhold Publishing Corp., 1967 for curing agents and mechanisms of cure for polyester resins. The resins will be in the liquid form so that the open-cell sheet can be properly impregnated. Of the epoxy resins, particularly preferred are the liquid glycidyl polyethers of polyhydric phenols, such as the diglycidyl ether of bisphenol A (BPA) made by reacting epichlorohydrin and BPA and generally having a molecular weight of about 350 to 400 and an epoxide equivalent of about 180 to 200.

The fibrous reinforcing layer used in the process of this invention can be one of many of the reinforcing layers known in the art such as cellulosic paper; cotton fabric; asbestos paper and fabric; nylon fabric; glass paper, mat or fabric; and metal filaments. The particular choice of reinforcing material of course will depend on the degree of stiffness required for the finished article. Particularly useful are glass and asbestos, reinforcing with glass paper, mat or fabric being preferred.

The sheet having open-cell structure acts as the reservoir for the resin as well as the core for the finished thermosetting resin article. This sheet of layer can be referred to as the reservoir sheet. Generally the sheet having the open-cell structure should be highly compressible, flexible, readily wettable by the liquid resin, and must possess an open connected cellular type structure to allow essentially unobstructed passage of the liquid resin throughout the sheet. Sheets which are particularly useful in this regard include sheets of batting of natural or synthetic materials as long as the material does not react with the thermosetting resin which is used to impregnate the sheet, thus cotton batting is useable in this particular process. However, it is preferable to use a foam sheet which has an open-cell structure which is suitably made of a thermoplastic material, polyurethane, or an elastomer. Polyurethane is particularly useful in this regard.

The gas pressure in the reservoir sheet can be generated by any suitable agent capable of releasing gas when heated or by chemical reaction. Generally, the gas release agent is chosen from known liquid or solid vaporizable, organic compounds which are compatible with the liquid thermosetting resin and can also be uniformly mixed with the resin. The gas release agent may be inert to the resin and decompose upon heating to form a gas or a composition may be employed which acts as both a curing agent for the resin and as a gas release agent. An example of the latter are the amine carbamate salts disclosed in U.S. Pat. No. 3,320,187 to Burt and the amine carbonate salts disclosed in U.S. Pat. No. 3,425,964 to Stanley, and as far as is pertinent, the disclosures of those patents are incorporated herein by reference.

The gas release agents may be a vaporizable substance which merely forms a gas on heating or it may be a decomposable substance which breaks down upon heating into one or more gaseous or vaporizable components. If the gas release agent is vaporizable, the normal boiling point of such an agent may be below atmospheric temperature provided it is sufficiently soluble in the resin composition so that it does not vaporize therefrom as long as the resin composition itself is at atmospheric temperature. The boiling point of the fluid may be between −30° and 100° C and is preferably in the range between about 0° C and about 100° C. When using fluids having higher boiling points, e.g. up to 60° C to 100° C, extraneous heat is generally required to secure vaporization in addition to the heat developed during the curing process. If desired, mixtures of agents may be employed in which a lower boiling fluid provides the initial expansion and a higher boiling fluid provides further substantial expansion as the temperature of the total mixture rises. The chemical composition of the vaporizable agents employed is of not particular importance so long as they are not reactive with the remaining components of the resin mixture. Suitable fluids, for example, are hydrocarbons such as pentanes, hexanes, cyclohexane, hexenes, pentenes, heptanes, 2,2,4-trimethylpentane, ethylchloride, methylene chloride, toluene, xylene, petroleum ether, or the like; substituted hydrocarbons, e.g., alcohols and halogen-substituted hydrocarbons, and oxygenated hydrocarbons such as acetone and methylethyl ketone. Some compounds which can be dissolved in the base resin mixtures and provide expansion by vaporization at elevated temperatures may have relatively high melting points, so that they are normally solids, i.e. "Porofor" N or "Porofor" ADC-M.

Preferred vaporizable agents are those polychlorofluoromethanes having boiling points in the desired range between −30° C and 100° C. A series of chlorofluoroalkanes and alkenes is available under the trademarks "Freon" and "Genetron." Table 1 lists several such compounds which are suitable for use in the present invention. Other materials if this series having boiling points near or above atmospheric temperature may, however, also be employed.

TABLE 1

| "Freon" | "Genetron" | Formula | Boiling Point (° C.) |
|---------|------------|---------|---------------------|
| "Freon-11" | "Genetron-11" | $CCl_3F$ | +23.7 |
| "Freon-12" | "Genetron-12" | $CCl_2F_2$ | −29.8 |
| "Freon-21" |  | $CHCl_2F$ | +8.9 |
| "Freon-114" | "Genetron-316" | $CClF_2-CClF$ | +3.5 |
| "Freon-112" | "Genetron-112" | $CCl_2F-CCl_2F$ | +92.8 |
| "Freon-113" | "Genetron-113" | $CCl_2F-CClF_2$ | +47.6 |

In certain cases where curing temperatures above 100° C are used, even water might be used. Generally preferred in epoxy systems are the Freons especially Freon 11. Decomposable substances which can be used as gas release agents in the process of this invention are those which release carbon dioxide or nitrogen upon heating, such as N,N'-dinitroso-N,N'-dimethyl terephthalamide (DuPont's BL-353) and azo-isobutyronitrile.

The gas release agent is mixed in the liquid resin composition before the foam sheet is impregnated with the resin. The proportion of the agent in the resin depends on requirement; the higher said proportion is, the more effective will be the expulsion of resin from the foam sheet by gas pressure as compared with the pressure applied by compression of the sheet. Generally, the gas release agent will be included in levels of about 0.1 to about 50 parts per hundred resin (phr) and preferably about 0.5 to about 25 phr. If the gas release agent is a solid, such as the Porofors, it is preferable to mix about 0.5 to about 10 phr, while if the gas release agent is a liquid it is preferably used at about 1 to 20 phr.

It must be recognized that the above list of gas release agents is not exhaustive and that in choosing any particular gas release agent for a certain thermosetting resin system, the gas release agent must be compatible with the resin, i.e. must not react in such a way so that the ultimate cure of the resin is retarded or hindered to give undesirable properties in the finished product.

At least some compression of the foam sheet and reinforcing layer is necessary for thickness control of the resulting product and to improve surface texture. Suitably, most of the resin is expelled from the foam sheet by compression of the sheet, with some assistance being provided by the generated gas pressure, rather than vice-versa. However, if desired, the gas release agent may be used in such proportions as to account for a major share of the necessary impregnation of the reinforcing layer. The new method also permits materials which are not very compressible to be used for making the resin-carrying sheet which is to impregnate the reinforcing layer, for example, such porous materials as felt pads.

Furthermore, in cases that a satisfactory product can be obtained also without a gas release agent in the resin, the use of such an agent in accordance with the invention may permit a lower resin volume in the product, in particular if the core of the product is not required to provide great strength.

To illustrate the manner in which the invention may be carried out, the following embodiments are given. It is to be understood, however, that these embodiments are for the purpose of illustration and the invention is not to be regarded as limited to any of the specific materials or conditions recited therein.

EMBODIMENT I

A. A 40 mm thick sheet of open-celled flexible polyurethane foam was impregnated with a liquid epoxy resin composition including 5% by weight of azo-isobutyronitrile as a gas release agent. A glass fibre mat was placed on both sides of the impregnated sheet, and the laminate thus formed was placed in a mould heated at 180° C. As soon at the laminate was in the mould, compression was applied to the laminate by moving the opposite mould walls closer together to leave a spacing of 4 mm, thus defining the final thickness of the laminate. The laminate was left in the heated mould for two minutes. During the early moments of this period the gas release agent decomposed thereby generating nitrogen gas. After completion of the two minutes the laminate was removed from the mould as a rigid product in which the resin had set. The product showed a smooth surface formed by the resin-impregnated glass mats, while the core had still a cellular appearance with a specific gravity of 0.5.

B. The same experiment was repeated precisely as before but without the gas release agent in the resin; in order to attain the same surface quality as before 25% more resin had to be used in the foam. The specific gravity of the core was now 0.65.

1), two glass mats on each side of the sheet (2 + 2), and three mats on each side (3 + 3). The resin, curing agent, and gas release agent were uniformly blended together, then the foam sheet was impregnated with the curable resin. A foam compression ratio of 10:1 was used to produce an article of a 4 mm thickness. The pressing temperature used was 180° C and the press time was 2 minutes.

RESULTS

The results are tabulated in Table II as percentage decrease in specific gravity (s.g), percentage decrease in flexural modulus, and percentage decrease in flexural strength. The flexural properties were evaluated according to test method ISO R 178 and the percentage changes were determined by using a standard prepared the same as described above but without the use of a gas release agent.

The flexural strength decreased probably due to the greater void space in the foam sheet in turn due to lesser density because of lower resin content. The decrease in flex strength is also reflected in the decreasing flex modulus. The surprising result is found in the percentage decrease in binder consumption for the systems using a gas release agent as compared system using no gas release agent. By using the gas release agent the resin consumption can be reduced by up to 50% with minimal loss in flex properties.

TABLE II

| Gas Release Agent | Internal Pressure Agent Content phr | Percentage decrease in s.g. % | | | Percentage decrease in flexural modulus % | | | Percentage decrease in flexural strength % | | | Percentage decrease in binder consumption per m$^2$ | | |
|---|---|---|---|---|---|---|---|---|---|---|---|---|---|
| | | 1+1 glass | 2+2 glass | 3+3 glass | 1+1 glass | 2+2 glass | 3+3 glass | 1+1 glass | 2+2 glass | 3+3 glass | 1+1 glass | 2+2 glass | 3+3 glass |
| MEK | 5 | 17 | 16 | 17 | 12 | 0 | −6 | 13 | 29 | 15 | 26.3 | 26.0 | 29.8 |
| | 10 | 23 | 19 | 19 | 20 | 5 | 6 | 25 | 35 | 28 | 35.1 | 22.0 | 38.3 |
| | 15 | 27 | 22 | 22 | 26 | 10 | 19 | 35 | 40 | 42 | 42.1 | 38.0 | 46.8 |
| Freon 11 | 5 | 32 | 27 | 23 | 34 | 14 | 6 | 31 | 25 | 12 | 50.0 | 45.0 | 41.5 |
| | 10 | 32 | 27 | 23 | 34 | 15 | 7 | 31 | 36 | 21 | 50.0 | 45.0 | 41.5 |
| | 15 | 32 | 27 | 23 | 34 | 19 | 19 | 31 | 41 | 27 | 50.0 | 45.0 | 41.5 |

EMBODIMENT II

A series of experiments were performed to determine the effects of methylethyl ketone (MEK) and Freon 11 on certain properties of the thermosetting article made by this process.

MATERIALS AND PREPARATION

The curable thermosetting resin used was the liquid diglycidyl ether of bisphenol A which has a molecular weight of about 380 and an epoxide equivalent of about 190 (EPON$^{(R)}$ Resin 828 — Shell Chemical Co.) and the curing agent employed was isophorone diamine (IDP). The reservoir sheet was a polyurethane open-cell, flexible foam having a density of 13 grams/liter while the glass fiber reinforcing material was Stratimat M 4 (Isoverbel Co.) weighing 300 g/m$^2$. The gas release agents were MEK and Freon 11 and were used to the extents of 5, 10, and 15 phr.

The thermosetting resin articles were prepared using one glass mat on each side of the reservoir sheet (1 +

What we claim as our invention:

1. A compressible resin-containing reservoir suitable for use in preparing articles exhibiting good flexural strength comprising
a flexible, compressible, wettable open cell sheet impregnated with a mixture of (a) a curable thermosetting resin, (b) a curing agent for said resin, and (c) a compatible vaporizable substance which forms a gas on heating or decomposes upon heatng into one or more gaseous components.

2. The reservoir of claim 1 wherein the thermosetting resin is a liquid epoxy resin and the curing agent is an epoxy curing agent.

3. The reservoir of claim 1 wherein the open cell sheet is a polyurethane foam.

4. The reservoir of claim 1 wherein the vaporizable substance is a liquid having a boiling point between about 0° C and 100° C.

5. The reservoir of claim 4 wherein from about 0.1 to about 25 parts per hundred parts of resin of vaporizable substance is incorporated in the resin.

* * * * *